US011752695B2

(12) United States Patent
Kinoshita et al.

(10) Patent No.: US 11,752,695 B2
(45) Date of Patent: Sep. 12, 2023

(54) DISCHARGE APPARATUS, FORMING APPARATUS, AND METHOD OF PRODUCING FORMED BODY

(71) Applicant: LG Chem, Ltd., Seoul (KR)

(72) Inventors: Yoshihiro Kinoshita, Tokyo (JP); Eiichiro Narimatsu, Tokyo (JP)

(73) Assignee: LG Chem, Ltd.

( * ) Notice: Subject to any disclaimer, the term of this patent is extended or adjusted under 35 U.S.C. 154(b) by 133 days.

(21) Appl. No.: 17/040,331

(22) PCT Filed: Dec. 5, 2019

(86) PCT No.: PCT/KR2019/017065
§ 371 (c)(1),
(2) Date: Sep. 22, 2020

(87) PCT Pub. No.: WO2020/116946
PCT Pub. Date: Jun. 11, 2020

(65) Prior Publication Data
US 2021/0016503 A1    Jan. 21, 2021

(30) Foreign Application Priority Data

Dec. 6, 2018   (JP) ................. 2018-229026

(51) Int. Cl.
*B29C 64/209*   (2017.01)
*B33Y 30/00*    (2015.01)
(Continued)

(52) U.S. Cl.
CPC .......... *B29C 64/209* (2017.08); *B29C 64/112* (2017.08); *B29C 64/35* (2017.08);
(Continued)

(58) Field of Classification Search
None
See application file for complete search history.

(56) References Cited

U.S. PATENT DOCUMENTS 4,762,977 A * 8/1988 Browning ............... B05B 7/224
                                                       219/121.52
2006/0010687 A1   1/2006 Yasui
(Continued)

FOREIGN PATENT DOCUMENTS

AU   2014227444 A1    5/2015
CN   108031853 A  *  5/2018   ............. B22F 9/082
(Continued)

OTHER PUBLICATIONS

Supplementary European Search Report for EP19891853 dated Nov. 17, 2021, 2 pgs.
International Search Report for Application No. PCT/KR2019/017065 dated Mar. 17, 2020, 2 pages.

*Primary Examiner* — Joseph S Del Sole
*Assistant Examiner* — Ariella Machness
(74) *Attorney, Agent, or Firm* — Lerner David LLP

(57) ABSTRACT

A discharge apparatus, a forming apparatus, a method of operating the discharge apparatus, and a method of producing a formed body are disclosed herein. In some embodiments, a discharge apparatus is used to collide a particle with a fixed surface to fix the particle to the fixed surface, the discharge apparatus includes a first dispenser for discharging an aerosol containing the particle toward the fixed surface at a first discharge rate, and a second dispenser for discharging a gas toward the fixed surface at a second discharge rate faster than the first discharge rate, and the second dispenser discharges the gas so that the gas at least partially overlaps with the aerosol to accelerate at least a portion of the aerosol toward the fixed surface to fix the particle to the fixed surface.

6 Claims, 8 Drawing Sheets

Figure 1:
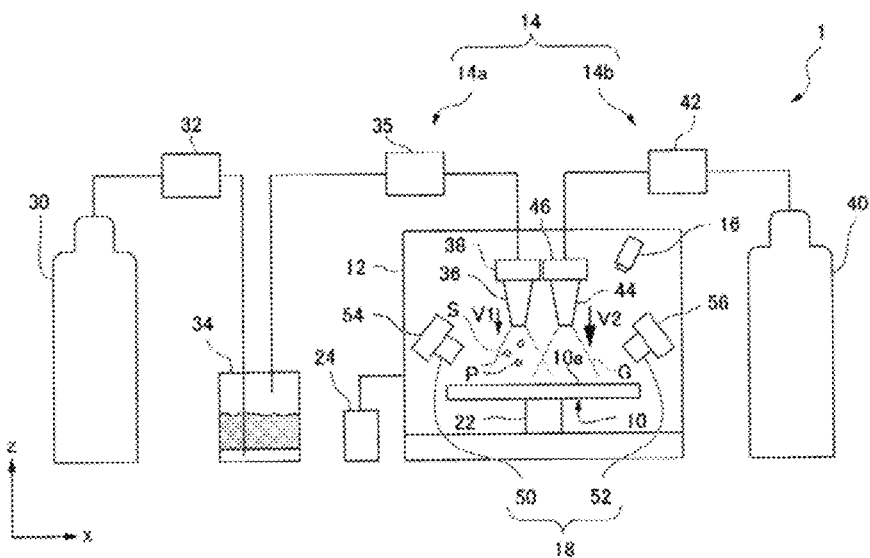

(51) Int. Cl.
*B29C 64/112* (2017.01)
*B33Y 10/00* (2015.01)
*B33Y 50/02* (2015.01)
*B29C 64/393* (2017.01)
*B29C 64/35* (2017.01)
*B33Y 40/20* (2020.01)

(52) U.S. Cl.
CPC ............ *B29C 64/393* (2017.08); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | |
|---|---|---|
| 2014/0291885 A1 | 10/2014 | Etchegoyen et al. |
| 2015/0174909 A1 | 6/2015 | Ahn et al. |
| 2016/0229119 A1 | 8/2016 | Renn |
| 2016/0266572 A1 | 9/2016 | Chang et al. |
| 2017/0226362 A1* | 8/2017 | Fratello ................ C09D 11/037 |
| 2017/0259501 A1 | 9/2017 | Gandhiraman et al. |
| 2018/0093347 A1 | 4/2018 | Obara et al. |
| 2018/0154577 A1 | 6/2018 | Lee |
| 2018/0162050 A1 | 6/2018 | Oh et al. |
| 2018/0311727 A1* | 11/2018 | Willmann ............... B22F 12/00 |

FOREIGN PATENT DOCUMENTS

| | | |
|---|---|---|
| JP | 2004081915 A | 3/2004 |
| JP | 2004277851 A | 10/2004 |
| JP | 2009249720 A | 10/2009 |
| JP | 2010180436 A | 8/2010 |
| JP | 4800074 B2 | 10/2011 |
| JP | 2011195885 A | 10/2011 |
| JP | 2014533779 A | 12/2014 |
| KR | 20150074623 A | 7/2015 |
| KR | 20160110073 A | 9/2016 |
| KR | 20160131954 A | 11/2016 |
| KR | 20170117159 A | 10/2017 |
| KR | 20180069661 A | 6/2018 |
| WO | 2017158738 A1 | 9/2017 |
| WO | 2018184066 A1 | 10/2018 |

* cited by examiner

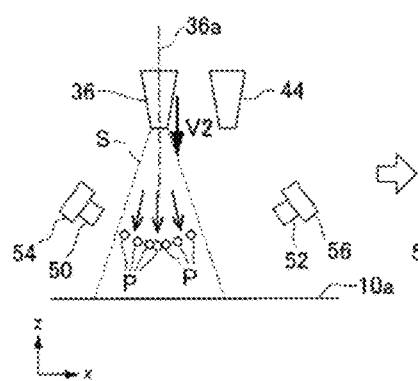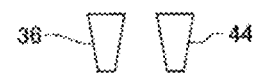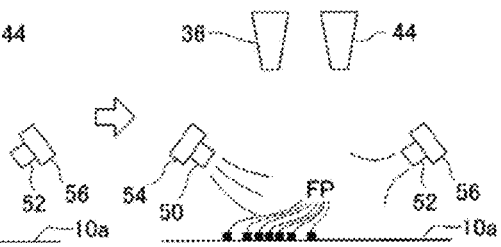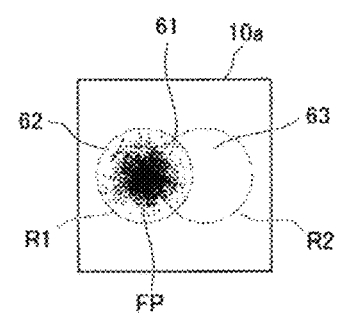

FIG. 9

DISCHARGE APPARATUS, FORMING APPARATUS, AND METHOD OF PRODUCING FORMED BODY

CROSS-REFERENCE TO RELATED APPLICATION(S)

The present disclosure is a national phase entry under 35 U.S.C. § 371 of International Application No. PCT/KR2019/017065, filed on Dec. 5, 2019, which claims priority to and the benefits of Japanese Patent Application No. 2018-229026, filed with the Japanese Patent Office on Dec. 6, 2018, the disclosures of which are incorporated by reference herein.

TECHNICAL FIELD

The present disclosure relates to a discharge apparatus, a forming apparatus, and a method of producing a formed body.

BACKGROUND ART

In recent years, three-dimensional prototyping techniques that use no mold have been developed to perform shaping of inorganic materials such as metals or metal oxides, organic•inorganic hybrid materials, or the like so as to have any three-dimensional shape.

For example, stereolithography, which is a representative three-dimensional prototyping technique for inorganic materials, is disclosed in Japanese Patent No. 4800074 (Patent Document 1) and the like. In the stereolithography, a formed body is once made of a binder (photocurable composition or the like) and inorganic particles dispersed therein, and then is heated to degrease the binder, and further, the formed body made of the inorganic particles after degreasing is subjected to high temperature firing to sinter the inorganic particles.

Meanwhile, a technique has been developed to form a thin film made of microparticles on a substrate at room temperature without using a binder by colliding an aerosol containing the microparticles with the substrate at high rate. According to this technique, the microparticles in the aerosol can be fixed to the substrate without performing a heating operation. The thin film thus formed is obtained in a state such as sintering at high temperature.

PRIOR ART DOCUMENT

Patent Document (Patent Document 1): Japanese Patent No. 4800074

DISCLOSURE

Technical Problem

In the stereolithography, there has been a case where if the three-dimensional shape becomes complicated, the residue of the thermally decomposed binder cannot be sufficiently removed from the formed body in the degreasing process. Further, in the sintering process, there has been a case where defect such as crack or damage in the formed body after the sintering is caused by a difference between thermal expansion rates for each portion of the formed body or the like.

Meanwhile, in order to apply to a bottom-up type three-dimensional shaping, a collision fixing method of the aerosol requires to form a similar sintered body as described above in a small size by intensively colliding the aerosol with a small region on the substrate, rather than discharging it to a large area as in the case of forming the thin film. However, since the aerosol sprayed from a dispenser has certain degree of spread until reaching the substrate, the particle collided with and fixed to the substrate is distributed on the substrate with a constant spread with respect to right below the dispenser. The fixed particle is the densest at the center of this distribution, and become sparser as it is away outward from the center of the distribution.

In the case of trying to directly fix the aerosol by spraying it from the dispenser toward the substrate, the distribution having a large spacing variation over such a relatively large region inevitably occurs, such that it has been difficult to limit the region where the particle is fixed to the desired small area.

An object of the present disclosure is to provide a discharge apparatus, a forming apparatus, and a method of producing a formed body having improved controllability of the fixed position of particle.

Technical Solution

One aspect of the present disclosure, as a discharge apparatus used to collide a particle with a fixed surface to fix the particle to the fixed surface, is the discharge apparatus including a first dispenser for discharging an aerosol containing the particle toward the fixed surface at a first discharge rate, and a second dispenser for discharging a gas toward the fixed surface at a second discharge rate faster than the first discharge rate, and the second dispenser discharges the gas so that the gas at least partially overlaps the aerosol discharged from the first dispenser to accelerate at least a portion of the aerosol toward the fixed surface to fix the particle to the fixed surface.

In the discharge apparatus of the aspect, the first discharge rate can be a rate at which the particle is not substantially fixed to the fixed surface if the aerosol discharged at the first discharge rate has collided with the fixed surface, and the second discharge rate can be a rate at which the particle is substantially fixed to the fixed surface if the aerosol discharged at the second discharge rate has collided with the fixed surface.

In the discharge apparatus of the aspect, the particle can be substantially fixed to the fixed surface if the aerosol has been discharged at a rate of any threshold (hereinafter, referred to as 'a critical rate') or more to collide with the fixed surface, the first discharge rate can be smaller than the critical rate of the particle, and the second discharge rate can be the critical rate or more of the particle.

In the discharge apparatus of the aspect, the first dispenser and the second dispenser can be configured so that a ratio of an area where the fixed particle covers a first portion of the fixed substrate and an area of the first portion is larger than a ratio of an area where the fixed particle covers a second portion of the fixed substrate and an area of the second portion if both the aerosol and the gas collide with the first portion of the fixed surface, and the aerosol collides with the second portion of the fixed surface but the gas does not collide with the second portion. Further, the first dispenser and the second dispenser can be configured so that the particle is fixed in the first portion, and the particle is not fixed in the second portion.

In the discharge apparatus of the aspect, the discharge apparatus can further include a first dispenser moving mechanism for changing the position and direction of the first dispenser, and a second dispenser moving mechanism for changing the position and direction of the second dispenser, and the first dispenser moving mechanism and the second dispenser moving mechanism can change a distance between the first dispenser and the second dispenser and an angle between a direction in which the first dispenser discharges the aerosol and a direction in which the second dispenser discharges the gas.

Another aspect of the present disclosure is a forming apparatus including a stage having a fixed surface, and a discharge apparatus of any one aspect described above.

In the forming apparatus of the aspect, the forming apparatus can further include a control unit for controlling the discharge apparatus so that a formed body having a three-dimensional shape is formed, based on three-dimensional shape data of the formed body. Further, the forming apparatus can further include a monitoring unit for monitoring the particle on the fixed surface, and the control unit can determine a region on the fixed surface where the aerosol is discharged and a region on the fixed surface where the gas is discharged, based on information from the monitoring unit.

In the forming apparatus of the aspect, the forming apparatus can further include a cleaning unit for removing the particle from the fixed surface if the particle has not been fixed to the fixed surface. Further, the cleaning unit can have an air supply apparatus for blowing off the particle from the fixed surface if the particle has not been fixed to the fixed surface. Further, the cleaning unit can have a recovery apparatus for recovering the particle from the fixed surface if the particle has not been fixed to the fixed surface.

Still another aspect of the present disclosure, as a method of producing a formed body in a predetermined shape from a fixed particle by colliding a particle with a fixed surface to fix the particle to the fixed surface, the method includes (a) discharging an aerosol containing the particle toward the fixed surface at a first discharge rate, and also discharging a gas, wherein the gas at least partially overlaps with the aerosol, toward the fixed surface at a second discharge rate faster than the first discharge rate to accelerate at least a portion of the aerosol toward the fixed surface to fix the particle to the fixed surface, and (b) cleaning that removes the particle if the particle has not been fixed to the fixed surface from the fixed surface, and (c) repeating steps (a) and (b) to form the formed body can be formed on the fixed surface.

In the method of producing the formed body of the aspect, the method of producing the formed body can further include (d) moving the fixed surface downward in the vertical direction after step (b), and wherein step (c) further comprises repeating steps (a) to (d) to form the formed body having a three-dimensional shape.

In the method of producing the formed body of the aspect, the method of producing the formed body can further include monitoring the particle on the fixed surface, and determining a position that determines a region on the fixed surface where the aerosol is discharged and a region on the fixed surface where the gas is discharged during step (a), based on information obtained in the monitoring.

DESCRIPTION OF DRAWINGS

FIG. 1 is a schematic front diagram showing a forming apparatus according to an embodiment.

FIG. 2 is a perspective diagram showing the discharged appearance of an aerosol and a gas by a first dispenser and a second dispenser according to an embodiment.

FIGS. 3A-D is a diagram virtually showing an operation of the forming apparatus according to an embodiment in the case of having discharged the aerosol from the first dispenser at a first discharge rate without using the second dispenser.

FIGS. 4A-D is a diagram virtually showing an operation of the forming apparatus according to an embodiment in the case of having discharged the aerosol from the first dispenser at a second discharge rate without using the second dispenser.

FIGS. 5A-D is a diagram showing an operation of the forming apparatus according to an embodiment in the case of having discharged the aerosol from the first dispenser at the first discharge rate and also having discharged the gas from the second dispenser at the second discharge rate.

FIG. 6 is a perspective diagram showing a variation in the discharged appearance of the aerosol and the gas according to a change in the arrangement of the discharge apparatus according to an embodiment.

FIG. 7 is a perspective diagram showing a variation in the discharged appearance of the aerosol and the gas according to a change in the arrangement of the discharge apparatus according to an embodiment.

FIG. 8 is a perspective diagram showing a variation in the discharged appearance of the aerosol and the gas according to a change in the arrangement of the discharge apparatus according to an embodiment.

FIG. 9 is a block diagram showing an example of a system configuration of the forming apparatus according to an embodiment.

FIG. 10 is a flowchart showing an example of a method of producing a formed body by the forming apparatus according to an embodiment.

FIG. 11 is a perspective diagram showing the discharged appearance of the aerosol and the gas by a first dispenser and a second dispenser according to a modified example of an embodiment.

DESCRIPTION OF REFERENCE NUMERALS

1: forming apparatus
10: stage
10*a*: fixed surface
12: chamber
14: discharge apparatus
14*a*: first discharge apparatus
14*b*: second discharge apparatus
16: monitoring unit
18: cleaning unit
20: control unit
22: stage moving mechanism
24: vacuum pump
30: first gas cylinder
32: first flow rate regulator
34: aerosol generator
35: second flow rate regulator
36: first dispenser
38: first dispenser moving mechanism
40: second gas cylinder
42: third flow rate regulator
44: second dispenser
46: second dispenser moving mechanism
48: discharge control unit
50: air supply apparatus
52: recovery apparatus
54: air supply apparatus moving mechanism
56: recovery apparatus moving mechanism
61: first portion 62: second portion
63: third portion
70: input unit

BEST MODE

Hereinafter, a discharge apparatus, a forming apparatus, and a method of producing a formed body according to embodiments of the present disclosure will be described with reference to the accompanying drawings. Further, in the following description, the same reference numerals refer to components having the same or similar function. The overlapping description of these components will be appropriately omitted.

For convenience of explanation, the x-direction, the y-direction, and the z-direction will be defined. The x-direction and the y-direction are directions parallel to the horizontal plane. The y-direction is a direction intersecting (for example, approximately orthogonal) with the x-direction. The z-direction is a direction parallel to the vertical direction and is approximately orthogonal to the x-direction and the y-direction.

In the present specification, an 'aerosol' means a sol in which a fine solid particle, a liquid particle, or both has been dispersed in a colloidal form in a gas.

In the present specification, a 'fixed' means a state fixed to an object by a chemical bond or a physical bond. Further, if a large number of particles collided with the object are said to be 'substantially fixed' to the object, it means that 50% or more of the number of particles among a large number of particles collided with the object are fixed to the object. On the contrary, if a large number of particles are said to be 'not substantially fixed' to the object, it means that 90% or more of the number of particles among a large number of particles collided with the object are not fixed to the object. Further, the object to which the particle is fixed can be a stage, a substrate supported on the stage or the like, a surface such as another particle or a material film already fixed to the stage or the substrate, but in the present specification, these are collectively referred to as 'fixed surface.' However, the object to be fixed does not necessarily have a large surface, and as described above, a case where a portion of the particle fixed in an island form is fixed to the stage or the substrate, or the like is referred to as being 'fixed to the fixed surface.' Further, in the present specification, the substrate of the case where the substrate is disposed on the stage is also collectively referred to as 'stage'. Hereinafter, although the case where the particle is fixed to the stage (or the substrate supported by the stage) is mainly described, the following description is also applied to the case where the particle is fixed to another fixed surface such as another particle.

Figure 2:
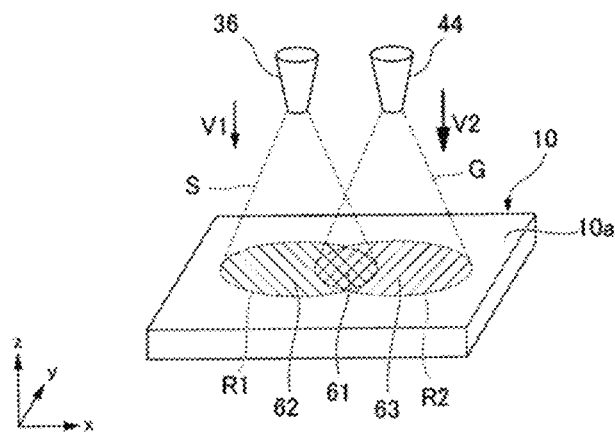

A forming apparatus 1 according to an embodiment will be described with reference to FIGS. 1 and 2. FIG. 1 is a schematic front diagram showing the forming apparatus 1 according to an embodiment. FIG. 2 is a perspective diagram showing the discharged appearance of an aerosol (S) and a gas (G) by a first dispenser 36 and a second dispenser 44 according to an embodiment.

[Configuration]

The forming apparatus 1 can produce a three-dimensional formed body (formed body) made of an inorganic material. Herein, the 'inorganic material' refers to any material other than an organic material, and contains a compound consisting of a metal group, an alloy, a metal element, and a nonmetal element (for example, metal oxide, metal nitride, metal salt, or the like), a compound consisting of a nonmetal element (for example, boron nitride or the like), or the like. However, the three-dimensional formed body produced by the forming apparatus 1 can further contain an organic material. Further, the forming apparatus 1 can also be used to produce the three-dimensional formed body consisting only of the organic material.

Figure 9:
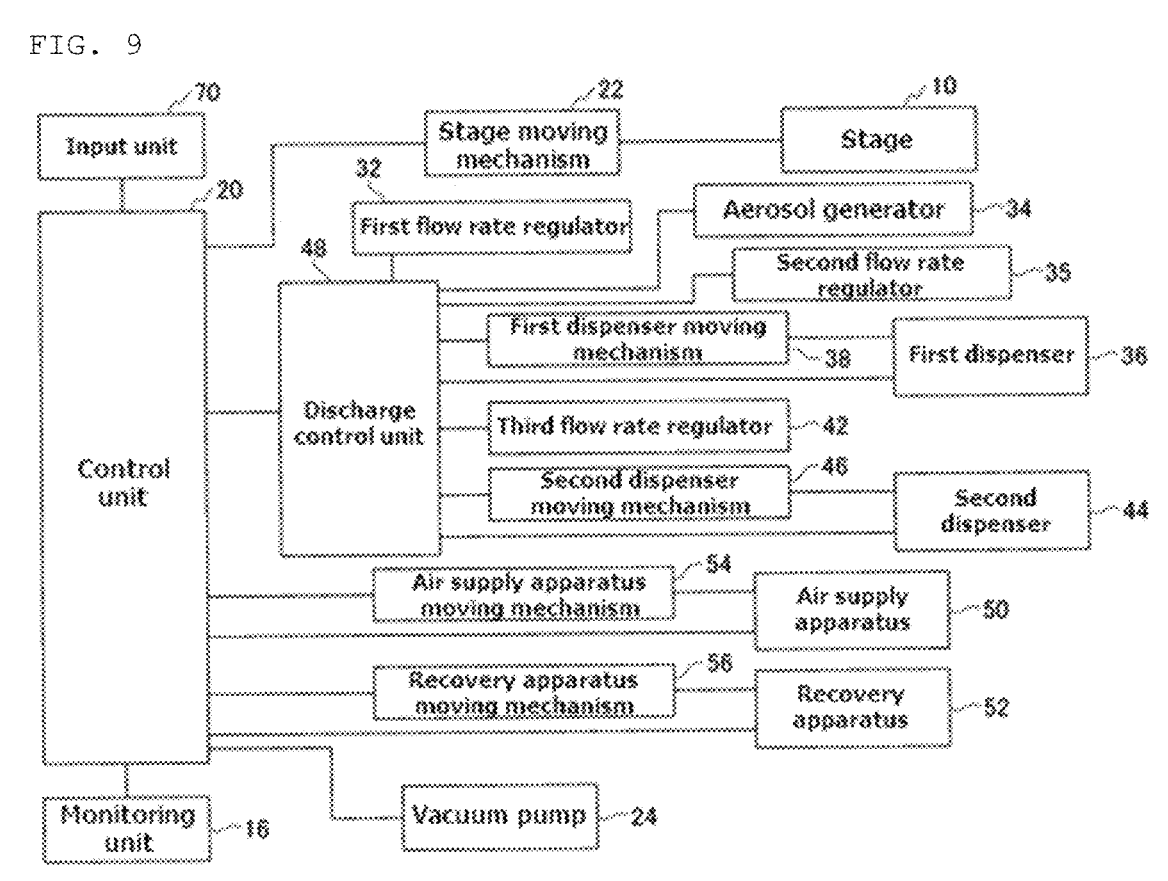

As shown in FIG. 1, the forming apparatus 1 includes a stage 10, a chamber 12, a discharge apparatus 14, a monitoring unit 16, a cleaning unit 18, and a control unit 20 (see FIG. 9).

As shown in FIG. 2, the stage 10 is a flat plate disposed along a horizontal surface (that is, parallel to the xy plane). The thickness direction of the stage 10 is substantially parallel to the z direction. The stage 10 is movable at least in the z direction by a stage moving mechanism 22 (see FIG. 1). The stage moving mechanism 22 is, for example, a rack and pinion type actuator driven by a motor (not shown). However, the stage 10 can be disposed in parallel with another direction, such as a perpendicular direction.

The stage 10 has a fixed surface 10a for fixing a particle (P). As described above, the fixed surface 10a can be the upper surface of the stage 10 itself, the upper surface of a substrate supported by the stage 10, and the surface of the particle (P) already fixed to the stage 10 or the substrate. A material of the substrate is not particularly limited, and can be an inorganic material, an organic material, and a hybrid material thereof.

As shown in FIG. 1, the chamber 12 accommodates the stage 10, a first dispenser 36 and a second dispenser 44 of a discharge apparatus 14, and a cleaning unit 18 to be described later. The inner space of the chamber 12 is separated from the outer space of the chamber 12. The inner space of the chamber 12 can be depressurized by a vacuum pump 24 connected to the chamber 12. It is possible to evacuate the inner space of the chamber 12 to perform a forming work in a negative pressure atmosphere, thereby suppressing a mixing of impurities and the like. Further, the inner space of the chamber 12 can be filled with an inert gas such as nitrogen gas or argon gas.

The discharge apparatus 14 includes a first discharge apparatus 14a for generating and discharging an aerosol (S), and a second discharge apparatus 14b for generating and discharging a gas (G). The first discharge apparatus 14a includes a first gas cylinder 30, a first flow rate regulator 32, an aerosol generator 34, a second flow rate regulator 35, the first dispenser 36, and the first dispenser moving mechanism 38. The second discharge apparatus 14b includes a second gas cylinder 40, a third flow rate regulator 42, a second dispenser 44, and a second dispenser moving mechanism 46. The discharge apparatus 14 further includes a discharge control unit 48 (see FIG. 9) for controlling the first discharge apparatus 14a and the second discharge apparatus 14b.

The first discharge apparatus 14a generates the aerosol (S) to discharge it toward the stage 10. The first gas cylinder 30 of the first discharge apparatus 14a accommodates the gas for generating the aerosol (S). The gas can be any gas such as air, oxygen gas, hydrogen gas, or organic gas, other than an inert gas such as helium gas, nitrogen gas, or argon gas. The gas in the first gas cylinder 30 is sent to the aerosol generator 34 at a flow rate regulated by the first flow rate regulator 32.

The first flow rate regulator 32 can use any one such as a mass flow controller or a simple pressure regulating valve as long as it can regulate the flow rate of the gas from the first gas cylinder 30. The first flow rate regulator 32 is controlled by the discharge control unit 48 (see FIG. 9).

The aerosol generator 34 accommodates the particle (P) for the aerosol (S). The aerosol generator 34 receives the gas from the first gas cylinder 30. The gas is mixed with the particle (P) inside the aerosol generator 34 to form the aerosol in which the particle (P) has been dispersed in the high pressure gas. The formed aerosol is sent from the aerosol generator 34 to the first dispenser 36 through the second flow rate regulator 35 as the aerosol (S). Details of the particle (P) will be described later.

Further, a configuration of the aerosol generator 34 is not limited to the above example. For example, the aerosol can be generated by spraying a dispersion of the particle (P) into the gas to dry it, and the spraying of the dispersion can use electrostatic spraying, sonic spraying, inkjet technology, or the like, other than pressure spraying. Further, any aerosol generator can be used as long as the aerosol in which the particle (P) has been dispersed in the gas is formed.

The second flow rate regulator 35 regulates the flow rate of the aerosol (S) supplied from the aerosol generator 34 to the first dispenser 36. As with the first flow rate regulator 32, the second flow rate regulator 35 can use any one as long as it can regulate the flow rate of the gas. The second flow rate regulator 35 is controlled by the discharge control unit 48 (see FIG. 9). Further, the second flow rate regulator 35 can be installed as a component of the aerosol generator 34. Alternatively, the second flow rate regulator 35 can be omitted, and the first flow rate regulator 32 can collectively control including the flow rate of the aerosol (S) supplied to the first dispenser 36.

The first dispenser 36 is in the form of a tapered nozzle having an opening at the tip. The first dispenser 36 is spaced apart from the stage 10 to be disposed above the stage 10. However, the arrangement of the first dispenser 36 is not limited to the above example, and the first dispenser 36 can be disposed below or at the side of the stage 10. The first dispenser 36 is movable in at least one direction of the x direction, the y direction, and the z direction by the first dispenser moving mechanism 38. Further, the first dispenser 36, for example, can be rotated around the z axis by the first dispenser moving mechanism 38, and can also be rotated in the plane parallel to the z axis by the first dispenser moving mechanism 38. The first dispenser moving mechanism 38 is, for example, an articulated arm driven by a motor (not shown).

The first dispenser 36 discharges the aerosol (S) sent from the aerosol generator 34 from the opening at the tip toward the stage 10 at a first discharge rate (V1). The first dispenser 36 can discharge the aerosol (S) intermittently or continuously. The discharge rate of the aerosol (S) by the first dispenser 36 can be appropriately regulated by the second flow rate regulator 35. However, the regulation of the discharge rate can be performed by regulating the pressure difference between the chamber 12 and the aerosol generator 34, or by switching the diameter or shape of a nozzle of the first dispenser 36 with a drive mechanism not shown, and these methods can be used together with the second flow rate regulator 35. Further, the discharge rate of the aerosol (S) can be detected by, for example, a rate detector (not shown) installed between the first dispenser 36 and the stage 10 in the chamber 12.

Further, the first discharge apparatus 14*a* can include a crusher for dispersing the aggregated particle (P) in the aerosol (S), a filter, a classifier, or the like for separating the particle (P) exceeding a predetermined size.

The second discharge apparatus 14*b* generates the gas (G) to discharge it toward the stage 10. The second gas cylinder 40 of the second discharge apparatus 14*b* accommodates the gas for the gas (G). The gas can be any gas such as air, oxygen gas, hydrogen gas, or organic gas, other than an inert gas such as helium gas, nitrogen gas, or argon gas, as with the gas accommodated in the first gas cylinder 30. The gas in the second gas cylinder 40 is sent to the second dispenser 44 at a flow rate regulated by the third flow rate regulator 42.

As with the first flow rate regulator 32, the third flow rate regulator 42 can use any one as long as it can regulate the flow rate of the gas from the second gas cylinder 40. The third flow rate regulator 42 is controlled by the discharge control unit 48 (see FIG. 9).

The second dispenser 44 is in the form of a tapered nozzle having an opening at the tip. The second dispenser 44 is disposed at the same side as the first dispenser 36 with respect to the stage 10. For example, the second dispenser 44 is disposed in parallel with the first dispenser 36. As with the first dispenser 36, the second dispenser 44 is movable in at least one direction of the x direction, the y direction, and the z direction by the second dispenser moving mechanism 46. Further, the second dispenser 44, for example, can be rotated around the z axis by the second dispenser moving mechanism 46, and can also be rotated in the plane parallel to the z axis by the second dispenser moving mechanism 46. The second dispenser moving mechanism 46 is, for example, an articulated arm driven by a motor (not shown).

The second dispenser 44 discharges the gas (G) sent from the second gas cylinder 40 from the opening at the tip toward the stage 10 at a second discharge rate (V2). The second dispenser 44 can discharge the gas (G) intermittently or continuously. The discharge rate of the gas (G) by the second dispenser 44 can be appropriately regulated by the third flow rate regulator 42 as with the aerosol (S). Further, as described above, the discharge rate can be regulated by changing the pressure difference, the nozzle diameter, or the like. Further, as with the aerosol (S), the discharge rate of the gas (G) can also be detected by a rate detector (not shown) installed in the chamber 12, for example.

The second discharge rate (V2) is faster than the first discharge rate (V1) at which the aerosol (S) is discharged from the first dispenser 36. The second dispenser 44 discharges the gas (G) toward the stage 10 so that the gas (G) at least partially overlaps the aerosol (S) discharged from the first dispenser 36. Details of the discharge of the aerosol (S) and the gas (G) will be described later.

The monitoring unit 16 monitors the appearance of the particle (P) on the stage 10. The monitoring unit 16 includes, for example, an imaging camera spaced apart from the stage 10 to be disposed above the stage 10. This imaging camera captures the appearance of the surface of the stage 10, and the monitoring unit 16 detects the position or shape of the particle (P) on the stage 10 based on the captured image (this detection work can be performed by the control unit 20 to be described later). Further, the component of the monitoring unit 16 is not limited to the imaging camera, and can be a radiation analysis apparatus (for example, X-ray diffraction apparatus) or an ultrasonic analysis apparatus, or the like, which observes the appearance of the stage surface by irradiating radiation or ultrasonic waves on the stage 10, and these can be used together.

The cleaning unit 18 includes an air supply apparatus 50 and a recovery apparatus 52. The cleaning unit 18 can remove the particle (P), other impurities, or the like remaining on the stage 10 without being fixed to the stage 10.

The air supply apparatus 50 blows out airflow to the stage 10 to blow off the particle (P) which has not been fixed to the stage 10, or the like. The air supply apparatus 50 can be any configuration as long as it generates the airflow. For example, the air supply apparatus 50 can be one that sprays the gas received from a gas supply source (not shown) from the nozzle, and can be one that generates the airflow by rotating a fan like an electric fan. The air supply apparatus 50 is movable by at least one direction of at least of the x direction, the y direction, and the z direction by the air supply apparatus moving mechanism 54. Further, the air supply apparatus 50, for example, can be rotated around the z axis by the air supply apparatus moving mechanism 54, and can also be rotated in the plane parallel to the z axis by the air supply apparatus moving mechanism 54. The air supply apparatus moving mechanism 54 is, for example, an articulated arm driven by a motor (not shown). However, the air supply apparatus 50 can be fixed. In this case, the air supply apparatus moving mechanism 54 is omitted.

The recovery apparatus 52 sucks and recovers the particle (P) blown off by the air supply apparatus 50. The recovery apparatus 52 can be any configuration as long as it has a suction function. However, the recovery apparatus 52 does not necessarily have the suction function, and can be only a member which has an opening for recovering the particle (P) blown off by the air supply apparatus 50. Further, the air supply apparatus 50 can be omitted and removal of the particle (P) which has not been fixed can be performed only by the suction of the recovery apparatus 52. As with the air supply apparatus 50, the recovery apparatus 52 is movable by at least one direction of at least of the x direction, the y direction, and the z direction by the recovery apparatus moving mechanism 56. Further, the recovery apparatus 52, for example, can be rotated around the z axis by the recovery apparatus moving mechanism 56, and can also be rotated in the plane parallel to the z axis by the recovery apparatus moving mechanism 56. The recovery apparatus moving mechanism 56 is, for example, an articulated arm driven by a motor (not shown). However, the recovery apparatus 52 can be fixed. In this case, the recovery apparatus moving mechanism 56 is omitted.

If it has been determined that the particle (P) which has not been fixed to the stage 10 remains from the information acquired by the monitoring unit 16 after cleaning the stage 10, the cleaning unit 18 can clean the stage 10 by the air supply apparatus 50 and the recovery apparatus 52 again. Alternatively, the cleaning unit 18 can be configured to periodically clean the stage 10.

The recovery apparatus 52 can return the recovered particle (P) to the aerosol generator 34 again. Therefore, the particle (P) which has not been fixed to the stage 10 can be reused as a raw material of the aerosol (S).

The control unit 20 receives input data such as three-dimensional shape data of the formed body to be produced to control each component of the forming apparatus 1. The control unit 20 is realized by a processor such as a Central Processing Unit (CPU) or a Graphics Processing Unit (GPU), for example. An operation of the control unit 20 will be described later with reference to FIGS. 9 and 10.

[Aerosol Material]

The aerosol (S) discharged from the first dispenser 36 is formed of an aerosol in which the particle (P) has been dispersed in the gas supplied from the first gas cylinder 30.

The particle (P) is a particle consisting of any inorganic material such as metal, oxide, nitride, oxynitride, carbide, hydroxide, carbonate, or phosphate, any organic material, or a combination thereof. A material of the particle (P) is not particularly limited thereto.

Examples of the metal can be aluminum, titanium, iron, copper, stainless steel, nickel chromium steel, and the like.

Examples of the oxide can be silicon dioxide, aluminum oxide, magnesium oxide, titanium oxide, iron oxide, zinc oxide, yttrium oxide, zirconium oxide, barium titanate, lead zirconate titanate, and the like.

Examples of the nitride can be silicon nitride, aluminum nitride, titanium nitride, iron nitride, and the like.

Examples of the oxynitride can be silicon oxynitride, aluminum oxynitride, and the like.

Examples of the carbide can be silicon carbide, titanium carbide, boron carbide, zirconium carbide, and the like.

Examples of the hydroxide can be magnesium hydroxide, iron hydroxide, apatite hydroxide, and the like.

Examples of the carbonate can be calcium carbonate, sodium carbonate, potassium carbonate, lithium carbonate, and the like.

Examples of the phosphate can be iron phosphate, manganese phosphate, calcium phosphate, and the like.

Examples of the organic material can be hydrocarbon such as polyethylene or polyethylene terephthalate (PET), engineer plastic such as polystyrene or polyimide, fluorine-based polymer such as polytetrafluoroethylene (PTFE) or polyvinylidene fluoride (PVdF), biopolymer such as proteins or fats, and the like.

[Operation of the Discharge Apparatus]

An operation of the discharge apparatus 14 in an embodiment will be described with reference to FIGS. 2 to 5.

FIG. 2 is a perspective diagram showing the discharged appearance of the aerosol (S) and the gas (G) by the first dispenser 36 and the second dispenser 44 according to an embodiment.

As shown in FIG. 2, the gas (G) is discharged from the second dispenser 44 at the second discharge rate (V2) faster than the first discharge rate (V1) at which the aerosol (S) is discharged so as to at least partially overlap the aerosol (S) discharged from the first dispenser 36. Therefore, a portion which has overlapped the gas (G) among the aerosol (S) is accelerated toward the stage 10 by the gas (G) compared to the other portions of the aerosol (S). As a result, the aerosol (S) accelerated by the gas (G) collides in a first portion 61 which is a portion where a discharge region (R1) of the first dispenser 36 and a discharge region (R2) of the second dispenser 44 overlap. The aerosol (S) which is not accelerated by the gas (G) collides in a second portion 62 which is a portion where the discharge region (R1) of the first dispenser 36 and the discharge region (R2) of the second dispenser 44 do not overlap. The aerosol (S) does not substantially collide in a third portion 63 which is a portion of not overlapping the discharge region (R1) of the first dispenser 36 among the discharge region (R2) of the second dispenser 44. Here, the 'discharge region' virtually means a region where most of the particles (P) among the aerosol (S) (for example, 95%) land if the aerosol (S) has been discharged from the first dispenser 36 or the second dispenser 44 toward the stage 10.

The first discharge rate (V1) can be set to a rate at which the particle (P) is not substantially fixed to the stage if the aerosol (S) containing the particle (P) has been discharged from the first dispenser 36 toward the stage 10 at the first discharge rate (V1). Meanwhile, the second discharge rate (V2) can be set to a rate at which the particle (P) is substantially fixed to the stage 10 if the aerosol (S) containing the particle (P) has been discharged from the first dispenser 36 toward the stage 10 at the second discharge rate (V2). That is, if the aerosol (S) has been discharged at a discharge rate of any threshold (referred to as 'critical rate' in the present specification) or more, the particle (P) among the aerosol (S) is substantially fixed to the stage 10, the first discharge rate (V1) is smaller than the critical rate, and the second discharge rate (V2) is the critical rate or more. Here, the critical rate depends on the kind or size of the particle (P), a material of the stage 10 or the substrate, and the like. For example, if the particle (P) of $\alpha$-$Al_2O_3$ having an average particle diameter of about 0.4 μm is contained, and the particle (P) has been fixed to the substrate of copper spaced by 5 cm apart from the first dispenser 36 having a nozzle diameter of 3 mm by using the aerosol (S) using a nitrogen gas as a carrier gas, the critical rate is about 150 m/s. In this case, the first discharge rate (V1) is, for example, 20 m/s to 100 m/s, and preferably, 50 m/s to 80 m/s, and the second discharge rate (V2) is, for example, 200 m/s to 1000 m/s, and preferably, 400 m/s to 800 m/s. For example, the first discharge rate (V1) is 60 m/s, and the second discharge rate (V2) is 500 m/s.

As described above, it is possible to set the first discharge rate (V1) and the second discharge rate (V2), thereby substantially fixing only the particle (P) contained in the portion which has overlapped the gas (G) among the discharged aerosol (S) to the stage 10. This will be further described with reference to FIGS. 3 to 5.

FIGS. 3A-D are diagrams virtually showing the operation of the forming apparatus 1 according to an embodiment if the aerosol (S) has been discharged from the first dispenser 36 at the first discharge rate (V1) without using the second dispenser 44.

Figure 3A:
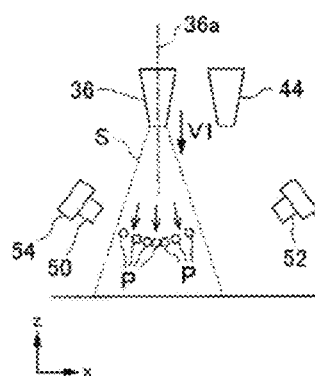

In FIG. 3A, the aerosol (S) is discharged from the first dispenser 36 toward the fixed surface 10a on the stage 10 at the first discharge rate (V1). The aerosol (S) is discharged with a constant spread from the tip of the first dispenser 36. The closer to the center axis 36a of the first dispenser 36, the larger the concentration of the aerosol (S) (furthermore, the concentration of the particle (P)), and the denser the particle (P) is.

Figure 3B:
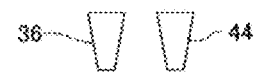

In FIG. 3B, the particle (P) among the discharged aerosol (S) lands on the fixed surface 10a. As described above, since the particle (P) among the aerosol (S) discharged at the first discharge rate (V1) is not substantially fixed to the fixed surface 10a, the entire particle (P) on the fixed surface 10a becomes a non-fixed particle (NP) which has not been fixed to the fixed surface 10a.

Figure 3C:
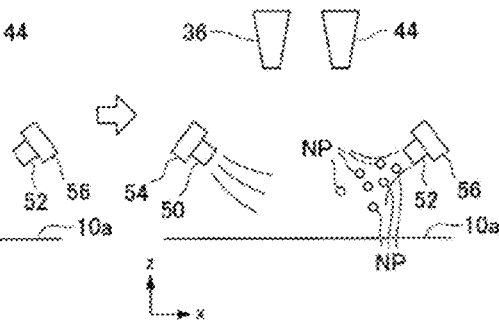

In FIG. 3C, the non-fixed particle (NP) on the fixed surface 10a is blown off by the airflow from the air supply apparatus 50 to be recovered by the recovery apparatus 52. Therefore, the entire particle (P) is substantially removed from the fixed surface 10a.

Figure 3D:
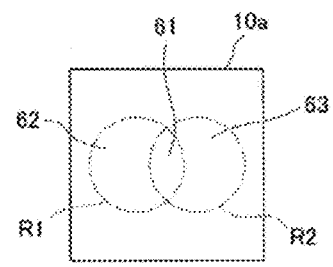

FIG. 3D is a plane diagram of the stage 10 viewed from the top after the operation of the air supply apparatus 50. Since the entire particle (P) is substantially removed, no particle (P) substantially remains even in any one of the discharge region (R1) of the first dispenser 36 and the discharge region (R2) of the second dispenser 44.

FIGS. 4A-D are diagrams virtually showing the operation of the forming apparatus 1 according to an embodiment if the aerosol (S) has been discharged from the first dispenser 36 at the second discharge rate (V2) without using the second dispenser 44. Further, in an embodiment described in the present specification, the first dispenser 36 discharges the aerosol (S) at the first discharge rate (V1) rather than the second discharge rate (V2) in the case of using the second dispenser 44 together.

In FIG. 4A, the aerosol (S) is discharged from the first dispenser 36 toward the fixed surface 10a on the stage 10 at the second discharge rate (V2).

In FIG. 4B, the particle (P) among the discharged aerosol (S) lands on the fixed surface 10a. As described above, since the particle (P) among the aerosol (S) discharged at the second discharge rate (V2) is substantially fixed to the fixed surface 10a, the entire particle (P) on the fixed surface 10a becomes a fixed particle (FP) fixed to the fixed surface 10a.

In FIG. 4C, the airflow is blown out from the air supply apparatus 50 to the fixed surface 10a, and since the entire particle (P) on the fixed surface 10a has been substantially fixed to the fixed surface 10a, it is not removed from the fixed surface 10a.

FIG. 4D is a plane diagram of the stage 10 viewed from the top after the operation of the air supply apparatus 50. Since the entire particle (P) is not substantially removed from the fixed surface 10a, the fixed particle (FP) remains over the entire discharge region (R1) of the first dispenser 36.

FIGS. 5A-D are diagrams showing the operation of the forming apparatus 1 according to an embodiment if the aerosol (S) has been discharged from the first dispenser 36 at the first discharge rate (V1) and the gas (G) has been discharged from the second dispenser 44 at the second discharge rate (V2). This corresponds to an example of the actual operation of an embodiment described in the present specification.

Figure 5A:
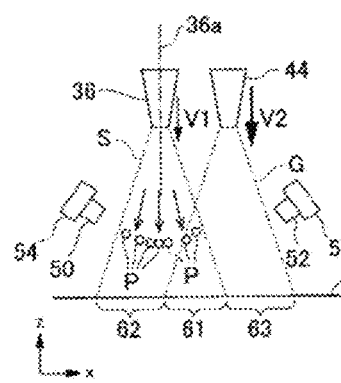

In FIG. 5A, the aerosol (S) is discharged from the first dispenser 36 toward the fixed surface 10a on the stage 10 at the first discharge rate (V1), and the gas (G) is discharged from the second dispenser 44 toward the fixed surface 10a at the second discharge rate (V2). Here, the aerosol (S) is accelerated toward the stage 10 by the stronger gas (G) in the region where the aerosol (S) and the gas (G) overlap.

Figure 5B:
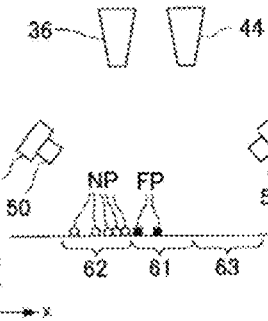

In FIG. 5B, the particle (P) among the discharged aerosol (S) lands on the fixed surface 10a. As described above, the gas (G) is discharged at the second discharge rate (V2), such that if the portion of overlapping the gas (G) among the discharged aerosol (S) is sufficiently accelerated by the gas (G), the particle (P) contained in the portion collides with the fixed surface 10a to be substantially fixed to the fixed surface 10a. For this reason, in the first portion 61 (see FIG. 2) which is the portion where the discharge region (R1) of the first dispenser 36 and the discharge region (R2) of the second dispenser 44 overlap, the entire particle (P) on the fixed surface 10a is the fixed particle (FP) fixed to the fixed surface 10a.

Meanwhile, since the aerosol (S) is discharged at the first discharge rate (V1), the particle (P) contained in the portion of not overlapping the gas (G) among the discharged aerosol (S) is not substantially fixed to the fixed surface 10a even when it collides with the fixed surface 10a. For this reason, in the second portion 62 (see FIG. 2) which is the portion of not overlapping the discharge region (R2) of the second dispenser 44 among the discharge regions (R1) of the first dispenser 36, the entire particle (P) on the fixed surface 10a is the non-fixed particle (NP) which has not been fixed to the fixed surface 10a.

Figure 5C:
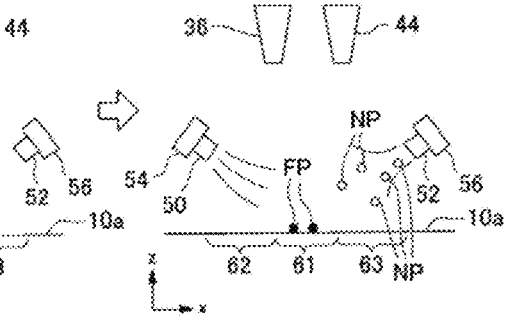

In FIG. 5C, the non-fixed particle (NP) on the fixed surface 10a is blown off by the airflow from the air supply apparatus 50 to be recovered by the recovery apparatus 52. Meanwhile, the fixed particle (FP) which is present in the first portion 61 is not blown off by the air supply apparatus 50 and remains on the fixed surface 10a.

Figure 5D:
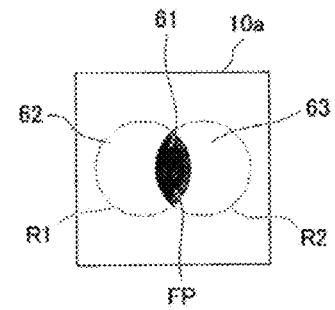

FIG. 5D is a plane diagram of the stage 10 viewed from the top after the operation of the air supply apparatus 50. As a result, the fixed particle (FP) substantially remains only in the first portion 61, and neither the fixed particle (FP) nor non-fixed particle (NP) substantially remain in the other portions. Even if some of the particles (P) have been accidentally fixed to the second portion 62, a rate of the first portion 61 covered with the fixed particle (FP) is much larger than that of the second portion 62. That is, the coverage of the first portion 61 defined by a ratio of the area where the fixed particle (FP) covers the first portion 61 and the entire area of the first portion 61 is much larger than the coverage of the second portion 62 defined by a ratio of the area where the fixed particle (FP) covers the second portion 62 and the entire area of the second portion 62.

Further, although more fixed particles (FP) are fixed to the first portion 61 in FIG. 5D compared to FIG. 4D, this is realized by discharging the aerosol (S) and the gas (G) in the case shown in FIG. 5 over a longer time than the case shown in FIG. 4, for example. Unlike the case shown in FIG. 4, since the non-fixed particle (NP) of the second portion 62 can be removed by the recovery apparatus 52 in the case shown in FIG. 5, the non-fixed particle (NP) can be removed by performing the discharge operation over a longer time than in FIG. 4, thereby intensively fixing the particle (P) which is equal to or more than that of the center portion of the discharge region (R1) of the first dispenser 36 in FIG. 4D to the first portion 61.

Further, since the aerosol (S) is not originally supplied to the third portion 63 which is the portion of not overlapping the discharge region (R1) of the first dispenser 36 among the discharge region (R2) of the second dispenser 44, the particle (P) does not substantially remain in the third portion 63 after the discharge operation.

As described above, it is possible to set the first discharge rate (V1) to be smaller than the critical rate and to also set the second discharge rate (V2) to be the critical rate or more to accelerate only the portion of overlapping the gas (G) among the aerosol (S) to the critical rate or more, thereby fixing only the particle (P) contained in the portion to the fixed surface 10a.

Further, it is possible to appropriately regulate the arrangement of the first dispenser 36 and the second dispenser 44 by the first dispenser moving mechanism 38 and the second dispenser moving mechanism 46, thereby regulating the position, size, or shape of the first portion 61 on the stage 10 as necessary.

Figure 6:
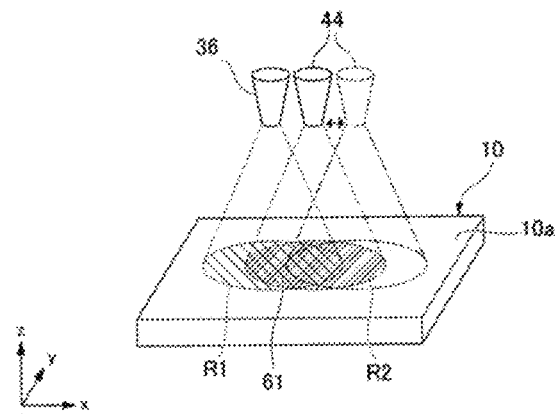

For example, as shown in FIG. 6, if the second dispenser 44 is moved in the x direction by the second dispenser moving mechanism 46 so that the second dispenser 44 is close to the first dispenser 36, the first portion 61, which is the portion where the discharge region (R1) of the first dispenser 36 and the discharge region (R2) of the second dispenser 44 overlap, becomes large, thereby fixing the particle (P) over a larger area at one time. On the contrary, in the case of making the area which fixes the particle (P) small, the second dispenser 44 can be moved by the second dispenser moving mechanism 46 so that the second dispenser 44 is away from the first dispenser 36.

Figure 7:
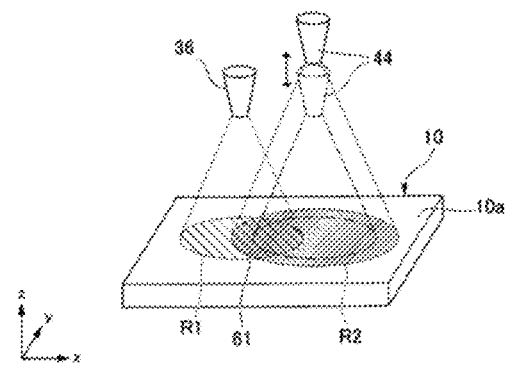

Further, for example, as shown in FIG. 7, if the second dispenser 44 is moved in the z direction (for example, upward) by the second dispenser moving mechanism 46 so that the second dispenser 44 is away from the stage 10, the discharge region (R2) of the second dispenser 44 becomes large to also increase the first portion 61, thereby fixing the particle (P) over a larger area at one time. On the contrary, if the second dispenser 44 is moved in the z direction (for example, downward) by the second dispenser moving mechanism 46 so that the second dispenser 44 is close to the stage 10, the discharge region (R2) of the second dispenser 44 can become small, thereby fixing the particle (P) to a smaller region.

Figure 8:
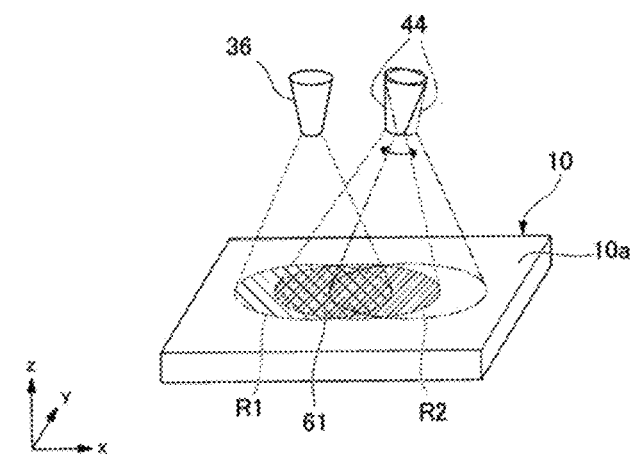

Further, as shown in FIG. 8, even in the case of having rotated the second dispenser 44 around the y axis by the second dispenser moving mechanism 46 so that the direction in which the second dispenser 44 discharges the gas (G) is inclined with respect to the normal direction of the stage 10, the first portion 61 can be made larger or smaller, thereby changing the area where the particle (P) is fixed.

[System Configuration]

Next, a system configuration of the forming apparatus 1 will be described with reference to FIG. 9.

FIG. 9 is a block diagram showing an example of a system configuration of the forming apparatus 1 according to an embodiment.

An input unit 70 receives the input data of the formed body to be produced (for example, three-dimensional structural data of the formed body), and also transmits the input data to the control unit 20.

The monitoring unit 16 acquires monitoring data of the particle (P) on the stage 10, and also transmits the monitoring data to the control unit 20. The monitoring data includes the position, shape, or the like of the fixed particle (FP) or the non-fixed particle (NP) of the stage 10.

The control unit 20 controls the stage moving mechanism 22 so that the stage 10 moves to an appropriate position, based on the input data received from the input unit 70, the monitoring data acquired from the monitoring unit 16, and the like, and also controls the air supply apparatus moving mechanism 54 and the recovery apparatus moving mechanism 56, respectively, so that the air supply apparatus 50 and the recovery apparatus 52 are appropriately disposed. Further, the control unit 20 controls a vacuum pump 24 to start, regulate, or stop the vacuuming of the inner space of the chamber 12 according to a user's input or the like.

The control unit 20 includes a discharge control unit 48 for controlling the discharge apparatus 14. The discharge control unit 48 controls the first discharge apparatus 14a and the second discharge apparatus 14b, respectively, based on the input data, the monitoring data, and the like. Specifically, the discharge control unit 48 controls the first flow rate regulator 32, the aerosol generator 34, and the second flow rate regulator 35 to supply the aerosol (S) to the first dispenser 36 at an appropriate amount or concentration, or an appropriate timing, and also controls the first dispenser 36 to discharge the aerosol (S) at an appropriate rate or at an appropriate timing. Further, the discharge control unit 48 controls the third flow rate regulator 42 to supply the gas (G) to the second dispenser 44 at an appropriate amount or at an appropriate timing, and also controls the second dispenser 44 to discharge the gas (G) at an appropriate rate or at an appropriate timing. Further, the discharge control unit 48 controls the first dispenser moving mechanism 38 and the second dispenser moving mechanism 46, respectively, so that the first dispenser 36 and the second dispenser 44 are appropriately disposed.

[Method of Producing the Formed Body]

Next, a method of producing the formed body by the forming apparatus 1 will be described with reference to FIG. 10.

Figure 10:
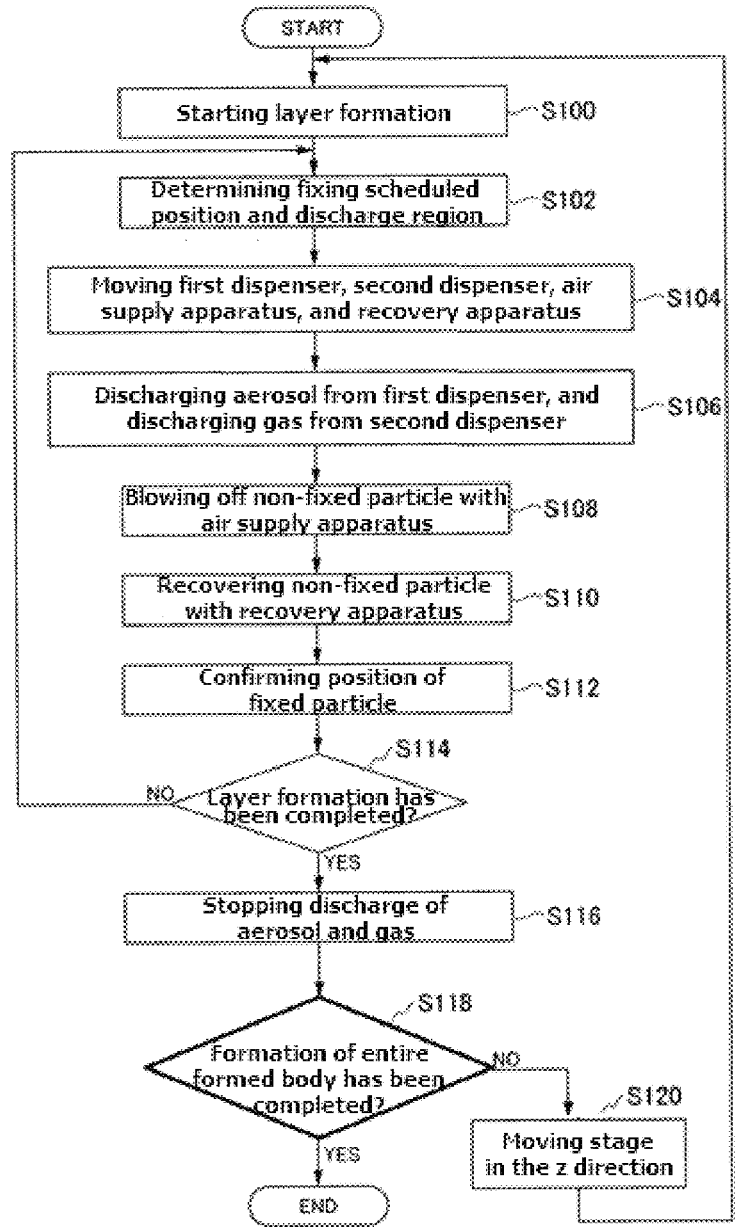

FIG. 10 is a flowchart showing an example of a method of producing the formed body by the forming apparatus 1 according to an embodiment.

If the formation of a first layer is started on the stage (S100), first, the control unit 20 determines a fixing scheduled position (corresponding to the first portion 61) which fixes the particle (P) on the stage 10, and also determines two discharge regions (corresponding to the discharge region (R1) of the first dispenser 36 and the discharge region (R2) of the second dispenser 44) to which the aerosol (S) and the gas (G) are discharged, respectively, in order to fix the particle (P) to the fixing scheduled position, based on the input data (S102).

Next, the control unit 20 instructs the first dispenser moving mechanism 38, the second dispenser moving mechanism 46, the air supply apparatus moving mechanism 54, and the recovery apparatus moving mechanism 56, respectively, to move the first dispenser 36, the second dispenser 44, the air supply apparatus 50, and the recovery apparatus 52 to change their positions or angles as necessary, based on the determined fixing scheduled position and each discharge region (S104).

Next, the control unit 20 instructs the first dispenser 36 to discharge the aerosol (S) toward the discharge region of the first dispenser 36, and also instructs the second dispenser 44 to discharge the gas (G) toward the discharge region of the second dispenser 44 (S106). Here, the control unit 20 instructs the second flow rate controller 35 based on a predetermined critical rate to regulate the flow rate of the aerosol (S) supplied to the first dispenser 36 so that the discharge rate of the first dispenser 36 is the first discharge rat (V1) which is smaller than the critical rate, and also instructs the third flow rate regulator 42 to regulate the flow rate of the gas (G) supplied to the second dispenser 44 so that the discharge rate of the second dispenser 44 is the second discharge rate (V2) which is the critical rate or more. As described above, the portion of overlapping the gas (G) among the discharged aerosol (S) is accelerated by the gas (G) to fix only the particle (P) contained in this portion to the stage 10. Further, the discharge timing of the first dispenser 36 and the discharge timing of the second dispenser 44 can be simultaneous, and can also have a time difference.

Next, the control unit 20 instructs the air supply apparatus 50 to blow out the airflow to the stage 10 to blow off the non-fixed particle (NP) from the stage 10 (S108). Further, the control unit 20 instructs the recovery apparatus 52 to recover the non-fixed particle (NP) blown off by the air supply apparatus 50 (S110). Further, the control unit 20 can instruct the air supply apparatus moving mechanism 54 and the recovery apparatus moving mechanism 56 so as to move the air supply apparatus 50 and the recovery apparatus 52 at this timing.

Next, the control unit 20 instructs the monitoring unit 16 to acquire the information of the fixed particle (FP) fixed to the stage 10 (S112). For example, the control unit 20 instructs the monitoring unit 16 to capture the image of the stage 10 viewed from the top with the imaging camera. The control unit 20 confirms the position or shape of the fixed particle (FP) on the stage 10, based on the image acquired by the monitoring unit 16 or the like. For example, the control unit 20 determines whether the fixed particle (FP) has been appropriately fixed to the fixing scheduled position, whether the fixed particle (FP) has not been fixed at a position other than the fixing scheduled position, whether the amount of the fixed particle (FP) fixed to the fixing scheduled position is appropriate, whether crack or the like has not occurred in the fixed particle (FP), or the like.

Next, the control unit 20 determines whether the formation of the first layer has been completed in view of the input data (S114). For example, the control unit 20 determines whether the fixing operation has not yet been performed among the fixing scheduled positions of the first layer in the input data with reference to the operation history so far, and if it has been determined that the fixing scheduled position where the fixing operation has not yet been performed is present, the control unit 20 determines that the formation of the first layer has not been completed. If it has been determined that the fixing operation was performed for the entire fixing scheduled position of the first layer, the control unit 20 determines that the formation of the first layer has been completed. Alternatively, the control unit 20 can compare and contrast the input data with the actual appearance on the stage 10 acquired by the monitoring unit 16 to calculate the degree of matching between the entire position where the fixing of the particle (P) should be performed in the first layer in the input data and the entire position where the particle (P) has been actually fixed on the stage 10. In this case, if it has been determined that the fixing scheduled position in the input data and the actual fixed position obtained by the monitoring unit 16 match sufficiently, the control unit 20 determines that the formation of the first layer has been completed.

If it has been determined that the formation of the first layer has not been completed (S114: NO), the control unit 20 returns to the S102 to determine the next fixing scheduled position and discharge region, based on the determination result. For example, if it has been determined that the fixed particle (FP) has been appropriately fixed to the fixing scheduled position, the control unit 20 determines the next fixing scheduled position and discharge region in the first layer in view of the input data. For example, if it has been determined that the amount of the fixed particle (FP) fixed to the fixing scheduled position is insufficient, the control unit 20 does not change the fixing scheduled position or slightly changes it to instruct the first dispenser 36 and the second dispenser 44 to perform the discharge again.

Here, the next fixing scheduled position is determined by any method. For example, the next fixing scheduled position is determined according to an order such as first moving from one end of the stage 10 to the other end thereof along the x direction, then moving slightly in the y direction, moving from one end of the stage 10 to the other end thereof along the x direction again, moving slightly in the y direction again, and the like, and can be determined based on the distance from the fixed position just before (for example, so that the fixing scheduled position closest to the fixed position just before is set to the next fixing scheduled position).

Further, the forming apparatus 1 can include a fixed particle removal means (not shown) for removing the particle (P) from the stage 10 if the particle (P) has been fixed to a position different from the fixing scheduled position in the input data. The fixed particle removing means is, for example, a cutting apparatus capable of position control which physically shaves off the particle (P) fixed to the stage 10.

Meanwhile, if it has been determined that the formation of the first layer has been completed (S114: YES), the control unit 20 instructs the first dispenser 36 and the second dispenser 44 to stop the discharge of the aerosol (S) and the gas (G) (S116).

Next, the control unit 20 determines whether the formation of the entire formed body has been completed in view of the input data (S118). For example, the control unit 20 determines whether the fixing operation has not yet been performed among the entire fixing scheduled positions of each layer in the input data with reference to the operation history so far, and if it has been determined that the fixing scheduled position where the fixing operation has not yet been performed is present, the control unit 20 determines that the formation of the entire formed body has not been completed. If it has been determined that the formation of the formed body has not been completed (S118: NO), the control unit 20 instructs the stage moving mechanism 22 to move the stage 10 in the z direction (for example, so as to lower it by one layer in the z direction) (S120). Thereafter, the flow returns to the S100 to start the formation of a second layer.

Meanwhile, if it has been determined that the formation of the entire formed body was completed (S118: YES), the formed body is completely produced. The formation from the first layer to the final layer is completed, thereby obtaining the formed body having any three-dimensional shape.

Effects

According to the forming apparatus 1 described above, only some small regions among the distribution of the aerosol discharged from the dispenser can be fixed to the stage. Therefore, it is possible to fix the particle in a much smaller region than the case where the particle is fixed by simply spraying the aerosol with the dispenser at high rate. That is, it is possible to improve the resolution and selectivity of the fixing position of the particle, and furthermore, the position controllability. It is possible to repeat the particle fixing to such a small region, thereby performing precise shaping of the three-dimensional formed body without requiring the use of the binder or the heat treatment.

Since no binder is used, the photocuring process or the degreasing process of the binder is unnecessary. Further, since the fixing at room temperature is possible, the sintering process is also unnecessary, and it is possible to suppress deterioration or damage of the material due to the heating. Further, since the heating process such as the degreasing process or the sintering process is unnecessary, the entire process of the forming work can be performed at room temperature, thereby not requiring a heating apparatus or the like. For this reason, the work can be remarkably easy and can also become low cost.

According to the present embodiment, the discharge apparatus 14 of the forming apparatus 1 further includes the first dispenser moving mechanism 38 for changing at least one side of the position and direction of the first dispenser 36, and the second dispenser moving mechanism 46 for changing at least one side of the position and direction of the second dispenser 44, and the first dispenser moving mechanism 38 and the second dispenser moving mechanism 46 can change at least one side of the distance between the first dispenser 36 and the second dispenser 44 and the angle between the direction in which the first dispenser 36 discharges the aerosol (S) and the direction in which the second dispenser 44 discharges the gas (G). According to such a configuration, the size or shape of the region (that is, the first portion 61) to which the particle (P) is fixed can be changed as necessary. Therefore, it is possible to improve the selectivity of the fixed position of the particle (P), and furthermore, to improve the freedom degree of the three-dimensional shaping by the forming apparatus 1.

According to the present embodiment, the forming apparatus 1 further includes the monitoring unit 16 for monitoring the particle (P) on the fixed surface 10a, and the control unit 20 determines at least one side of the region (R1) on the fixed surface 10a where the aerosol (S) is discharged and the region (R2) on the fixed surface 10a where the gas (G) is discharged, based on the information from the monitoring unit 16. According to such a configuration, since the next fixing scheduled position can be determined based on the position or shape of the particle (P) actually fixed to the stage 10, more precise shaping is possible. Further, since some degree of randomness is present in the distribution of the discharged aerosol (S), such randomness can be compensated by the above-described feedback control.

According to the present embodiment, the forming apparatus 1 further includes the cleaning unit 18 for removing the particle (P) which has not been fixed from the fixed surface 10a, and the cleaning unit 18 has the air supply apparatus 50 for blowing off the particle (P) which has not been fixed from the fixed surface 10a and the recovery apparatus 52 for recovering the particle (P) which has not been fixed from the fixed surface 10a. According to such a configuration, not only the non-fixed particle (NP) can be removed but also can be reused as a raw material of the aerosol (S) discharged after that, thereby reducing the cost of the forming work.

Modified Example

The above example forms the formed body by repeatedly using the aerosol (S) and the gas (G) together to fix the particle (P) to a small spot, but if it is necessary to fix the particle (P) to certain degree of a large area or the entire layer during the forming process, it is also possible to stop the supply of the gas (G) from the second dispenser 44 once, and to discharge the aerosol (S) from the first dispenser 36 at the second discharge rate (V2) which is the critical rate or more, thereby fixing the particle (P) to a large area at one time. That is, it is possible to switch the discharge rate of the first dispenser 36 and whether to use the second dispenser 44 as necessary, thereby distinguishing and using the fixing to a small area and the fixing to a large area according to the situation.

Figure 11:
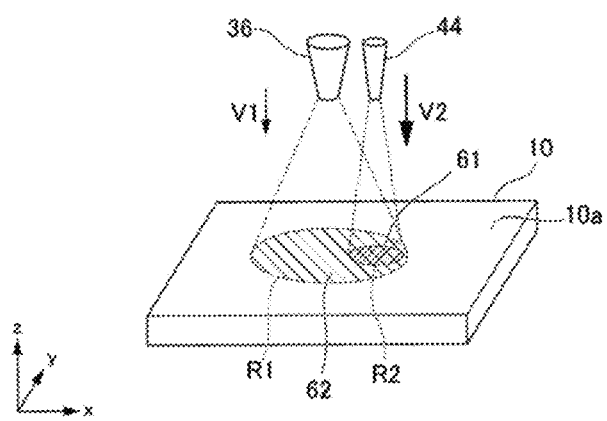

In the above example, the aerosol (S) and the gas (G) are discharged with the same degree of spread, but the spread of the gas (G) discharged from the second dispenser 44 can be reduced more than the first dispenser 36 as in FIG. 11. Even in this case, as with the above example, only the portion of overlapping the gas (G) among the aerosol (S) is accelerated so that the particle (P) among the aerosol (S) is fixed to the stage 10 only in the first portion 61 where the discharge region (R1) of the aerosol (S) and the discharge region (R2) of the gas (G) overlap. The non-fixed particle (NP) in the second portion 62 which does not overlap the discharge region (R2) of the gas (G) among the discharge region (R1) of the aerosol (S) is removed by the cleaning unit 18.

In the above example, the aerosol (S) containing one type of the particle (P) is discharged by using the first discharge apparatus 14a, but two or more types of the particle (P) can be used. For example, in order to discharge the aerosol containing the particle of a material different from that of the particle (P), a separate discharge apparatus which is the same as the first discharge apparatus 14a can be further installed. Further, the first discharge apparatus 14a can be configured to discharge different aerosols according to the situation by using a switching valve or the like.

In the above example, a nozzle having a circular opening is used, but configurations of the first dispenser 36 and the second dispenser 44 are not limited thereto. For example, the first dispenser 36 and the second dispenser 44 can have a rectangular or elliptical opening extending in the y direction. In this case, since the first portion 61 can be formed lengthily in the y direction, the efficiency of the forming work can be improved. If the fixing to a small region in the y direction is performed by such a dispenser, the second dispenser 44 can be, for example, disposed to be shifted from the first dispenser 36 in the y direction so that the first portion 61 is shortened in the y direction.

Further, a plurality of first dispensers 36 and a plurality of second dispensers 44 can be installed. For example, it is possible to dispose the plurality of first dispensers 36 and the plurality of second dispensers 44 in an array form, and individually controlling the discharge, respectively, thereby fixing the particle (P) to a plurality of positions at the same time.

In the above example, the cleaning unit 18 removes the particle (P) which has not been fixed (that is, the non-fixed particle (NP)) to the stage 10 by the air supply apparatus 50 and the recovery apparatus 52, but in addition to or instead of the above, a mechanism other than the removal by the airflow can also be used. For example, the cleaning unit 18 can have a mechanism which physically sweeps the non-fixed particle (NP) directly, and can have an adhesive member which the non-fixed particle (NP) is adhered. If the particle (P) is a magnetic particle, the cleaning unit 18 can have a mechanism for removing the non-fixed particle (NP) by a magnetic force. Further, these can also be used together.

As described above, although the present disclosure has been described with reference to the limited embodiments and drawings, the present disclosure is not limited thereto, and it is needless to say that various modifications and changes can be made by those skilled in the art to which the present disclosure pertains within the technical spirit of the present disclosure and the equivalent scope of the claims.

The invention claimed is:

1. A discharge apparatus for colliding a particle with a fixed surface to fix the particle to the fixed surface, the discharge apparatus comprising:

a first dispenser having a first opening for discharging an aerosol comprising the particle toward the fixed surface at a first discharge rate;

a first dispenser moving mechanism for changing position and direction of the first dispenser;

a second dispenser having a second opening for discharging a gas toward the fixed surface at a second discharge rate faster than the first discharge rate; and a second dispenser moving mechanism for changing the position and direction of the second dispenser, wherein the second dispenser discharges the gas so that the gas at least partially overlaps the aerosol discharged from the first dispenser to accelerate at least a portion of the aerosol toward the fixed surface to fix the particle to the fixed surface, wherein the fixed surface is oriented in an x-y plane, and wherein the first opening and the second opening are separated along the x-y plane, wherein the first dispenser moving mechanism and the second dispenser moving mechanism are capable of changing a distance between the first dispenser and the second dispenser in the x-y plane.

2. The discharge apparatus of claim 1, wherein if the particle is discharged at the first discharge rate and collides with the fixed surface without acceleration from the gas then the particle is not substantially fixed to the fixed surface, and wherein if the particle is discharged at the second discharge rate and collides with the fixed surface then the particle is substantially fixed to the fixed surface.

3. The discharge apparatus of claim 1, wherein if the particle is discharged at a critical rate or more then the particle is substantially fixed to the fixed surface, wherein the first discharge rate is smaller than the critical rate, and wherein the second discharge rate is greater than or equal to the critical rate.

4. The discharge apparatus of claim 1, wherein the first dispenser and the second dispenser are configured so that a ratio of an area where the fixed particle covers a first portion of the fixed substrate and an area of the first portion is larger than a ratio of an area where the fixed particle covers a second portion of the fixed substrate and an area of the second portion if both the aerosol and the gas collide with the first portion of the fixed surface, and the aerosol collides with the second portion of the fixed surface but the gas does not collide with the second portion.

5. The discharge apparatus of claim 4, wherein the first dispenser and the second dispenser are configured so that the particle is fixed in the first portion, and the particle is not fixed in the second portion.

6. The discharge apparatus of claim 1, wherein the first dispenser moving mechanism and the second dispenser moving mechanism are capable of changing a distance between the first dispenser and the second dispenser in a z-direction that is perpendicular to the x-y plane, and an angle between a direction in which the first dispenser discharges the aerosol and a direction in which the second dispenser discharges the gas.

* * * * *